Oct. 18, 1955  H. G. KAIRATH  2,720,897
DISC-CUTTING ATTACHMENT FOR POWER SAWS
Filed March 6, 1953

INVENTOR.
Howard G. Kairath,
BY
McMorrow, Berman + Davidson
ATTORNEYS

United States Patent Office 2,720,897
Patented Oct. 18, 1955

2,720,897
DISC-CUTTING ATTACHMENT FOR POWER SAWS

Howard G. Kairath, Howard Beach, N. Y.

Application March 6, 1953, Serial No. 340,788

2 Claims. (Cl. 143—171)

This invention relates to work-supporting attachments for power tools equipped with a working table and, in particular, to an attachment for a power saw for supporting unfinished work during the sawing operation.

An object of this invention is to provide an attachment for power saws which facilitates the shaping of a portion of unfinished stock or work to a predetermined radius.

Another object is to provide an attachment for power saws for cutting discs to a predetermined diameter.

Other objects and advantages will become apparent from a consideration of the following description and claims taken in view of the drawings.

Figure 1:
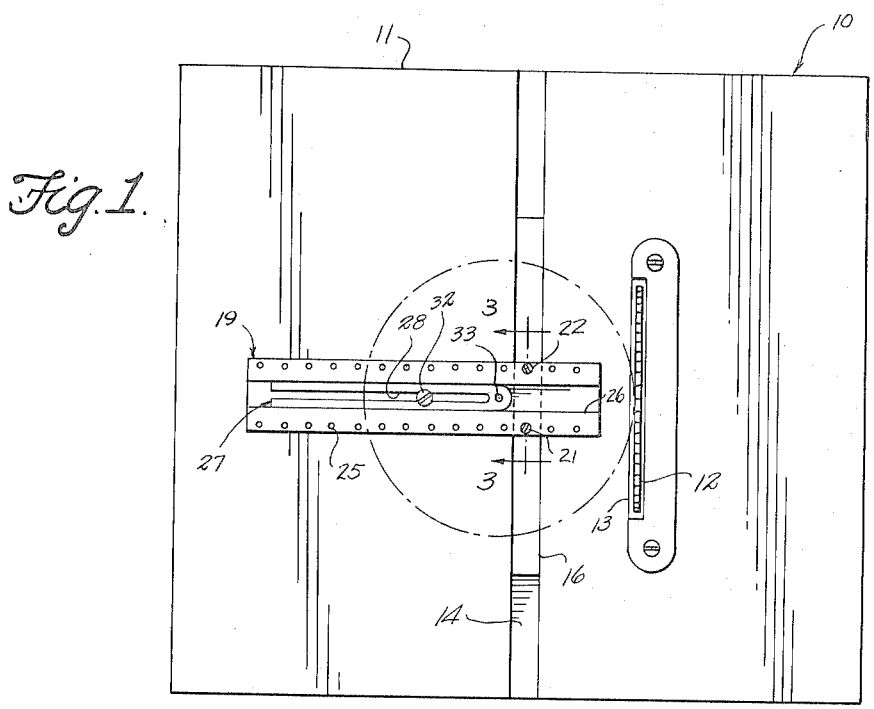
Figure 1 is a plan view of the work-supporting attachment according to the present invention mounted on the table of a power saw.

Referring now more particularly to the drawings wherein like reference numerals are used throughout, the numeral 10 designates generally a power saw having a table 11 and having a driven circular saw blade 12 extending through a slot 13 in the table 11. The blade 12 is operatively connected in a conventional manner to a motor, not shown, which is located beneath the table 11 and forms an integral part of the power saw structure 10. The upper surface of the table 11 is provided with a miter gauge slot 14 which is arranged in spaced parallel relation with respect to the blade 12.

Figure 2:
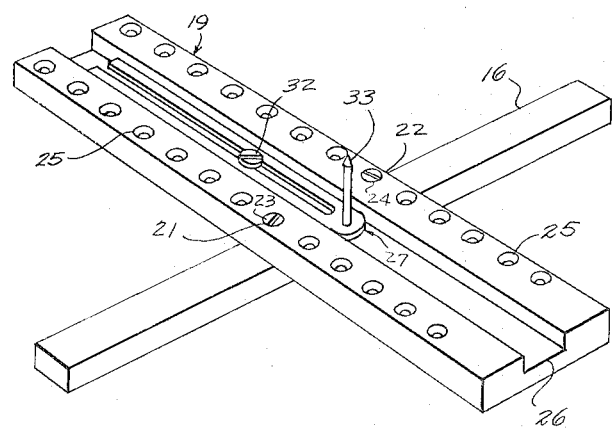
Figure 2 is an enlarged perspective view of the invention.
Figure 3:
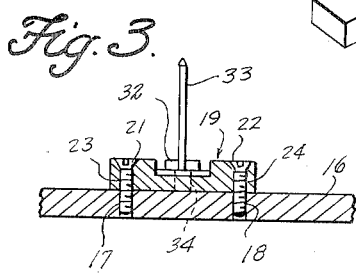
Figure 3 is an enlarged fragmentary view taken along lint 3—3 of Figure 1.

Slidable in the miter gauge slot 14 is a support block 16, Figure 1, which is provided with threaded bores 17 and 18 arranged in longitudinally spaced relation and extending transversely through the block 16, Figure 3. A frame 19 is positioned above and extends transversely of the support block 16 intermediate its ends, Figure 2. The frame 19 is provided with a plurality of countersunk holes 25 along each of the side edges and is removably and selectively connected to the block 16 by screw fasteners 21 and 22 which extend through a complemental pair of holes 23 and 24 and threadedly engage the bores 17 and 18 respectively. The frame 19 is further provided with a longitudinally extending groove 26 which is arranged perpendicularly with respect to the blade 12 when the frame 19 is connected to the block 16, as in Figure 1. Mounted in the groove 26 for reciprocatory sliding movement is a flat slide 27 which is provided with a slot 28 extending longitudinally inwardly from one end thereof. Projecting transversely from the other end of the slide 27 is an upstanding center pin 33 which receives the center hole of a piece of unfinished stock to be worked, as shown in phantom in Figure 1. A screw fastener 32 is positioned in the slot 28 of the slide 27 and is threadedly supported in a bore 34 provided in the base of the groove 26. The head of the fastener 32 frictionally engages the adjacent portions of the slide 27 to maintain the slide in a selected position of its reciprocatory movement.

When the work-supporting attachment of the present invention has been assembled and mounted on the table 11 of the power saw 10, the slide 27 is adjusted in order to secure the proper diameter of the piece of stock to be worked. The radius desired will determine whether the slide 27 is to be positioned as shown in Figures 1 and 2, or reversed in order to secure a larger radius. The desired radius will be that distance between the center pin 33 and the saw blade 12. If desired, a calibrated scale (not shown) may be placed on the table 11 or on the attachment in order to accurately determine the proper position of the center pin 33 with respect to the saw blade 12. When the slide 27 has been secured in the proper position by the screw fastener 32, a piece of work is mounted on the pin 33 by its center hole. The work is fed into the saw blade 12 by sliding the entire attachment along the miter gauge slot 14. At the end of the cut, the work and attachment are moved back to the starting position. The work is rotated about the pin 33 and the cutting operation is repeated. When a substantially circular shape has been achieved, the work is then kept in contact with the blade 12 and slowly rotated until a disc is formed. By varying the distance of the center pin 33 from the blade 12 and lowering the blade 12, undercuts and shoulders can be cut on the disc. By tilting the saw or table with respect to each other, bevel edges may be cut on the discs. Although the attachment has been shown in use with a power saw, it is clear that the attachment can be used with any suitable power tool which has a table built to accommodate a miter gauge slot or its equivalent.

What is claimed is:

1. A work-supporting attachment for a table including a saw blade extending through said table and at least one miter gauge slot in the table top arranged in parallel spaced relation with respect to saw saw blade, said attachment comprising support means slidable in said miter gauge slot and provided with at least one opening intermediate its ends, a frame connected to said support means and provided with a plurality of longitudinally spaced openings, connecting means extending through a selected opening in said frame and said opening in said support means for selectively connecting said frame to said support means, said frame being provided with a groove extending perpendicularly with respect to said blade, and means in said groove for adjustably holding a piece of work in operative engagement with said saw blade, said means including a slide and an upstanding center pin carried by said slide for holding said piece of work.

2. A work-supporting attachment for a table including a saw blade extending through said table and at least one miter gauge slot in the table top arranged in parallel spaced relation with respect to said saw blade, said attachment comprising support means slidable in said miter gauge slot and provided with at least one opening intermediate its ends, a frame connected to said support means and provided with a plurality of longitudinally spaced openings, connecting means extending through a selected opening in said frame and said opening in said support means for selectively connecting said frame to said support means, said frame being provided with a groove extending perpendicularly with respect to said blade, and means in said groove for adjustably holding a piece of work in operative engagement with said saw blade, said means embodying a slide mounted in said groove for reciprocatory movement, an upstanding center pin carried by said slide for holding said piece of work, and a fastener adjustably connecting said slide to said frame.

References Cited in the file of this patent

UNITED STATES PATENTS

| | | |
|---|---|---|
| 812,574 | Linton | Feb. 13, 1906 |
| 1,718,382 | Ross | June 25, 1929 |
| 1,789,125 | Wilderson | Jan. 13, 1931 |
| 1,956,912 | Tate et al. | May 1, 1934 |
| 2,157,310 | Ward | May 9, 1939 |